Oct. 30, 1928.  
B. A. LANDERS  
1,689,530  
CHRISTMAS TREE  
Filed Feb. 28, 1928
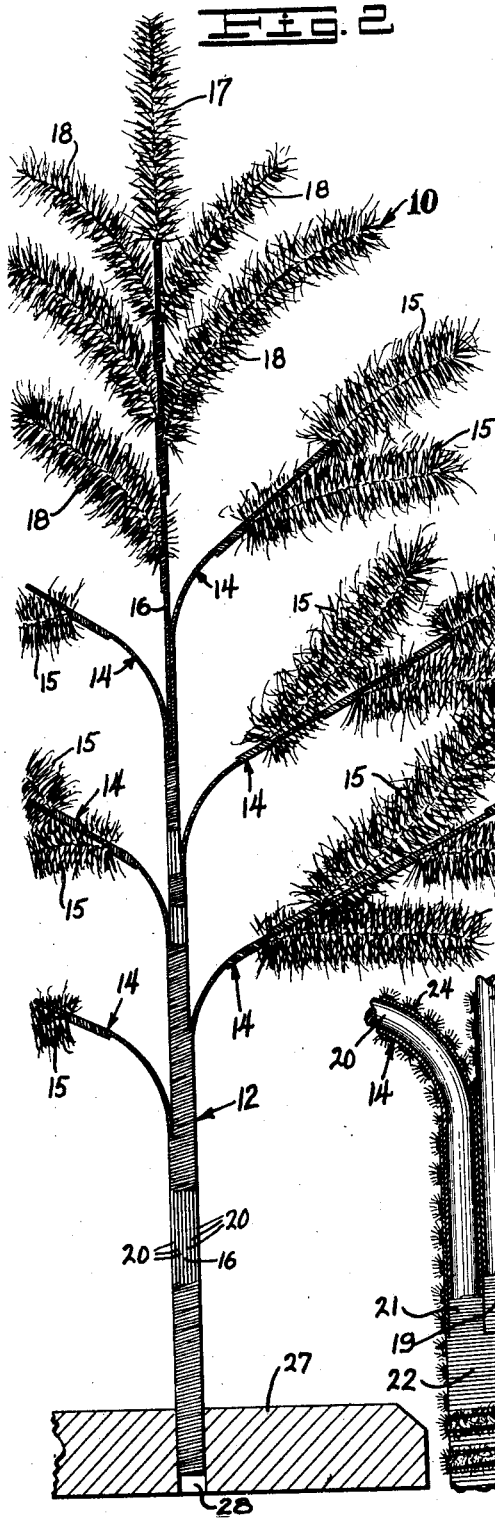
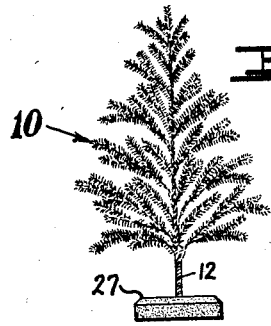
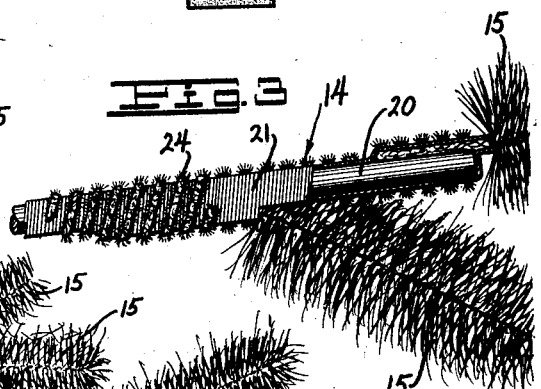
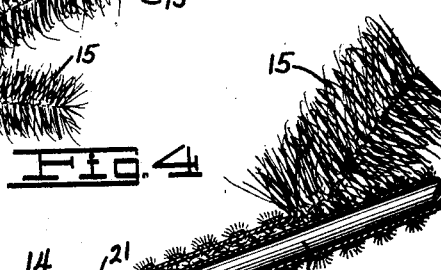
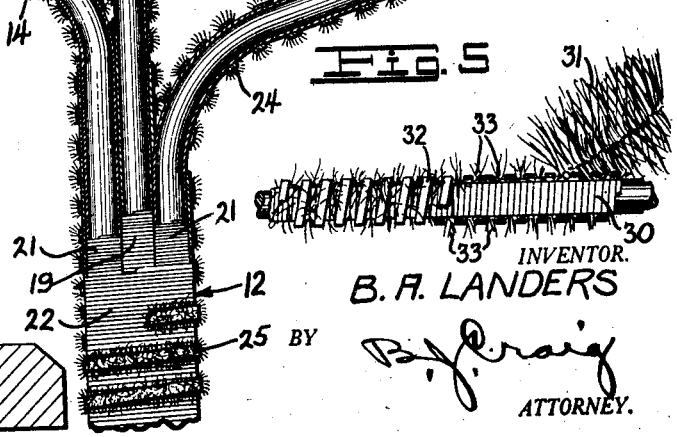
INVENTOR.  
B. A. LANDERS  
BY  
B. J. Craig  
ATTORNEY.

Patented Oct. 30, 1928.

1,689,530

UNITED STATES PATENT OFFICE.

BERT A. LANDERS, OF LOS ANGELES, CALIFORNIA.

CHRISTMAS TREE.

Application filed February 28, 1928. Serial No. 257,561.

This invention relates to improvements in artificial trees.

The general object of the invention is to provide an improved artificial Christmas tree which simulates a genuine tree and is highly decorative.

Another object of the invention is to provide an artificial tree having novel means for holding the parts assembled.

Other objects of this invention will be apparent from the following description taken in connection with the accompanying drawing wherein:

Fig. 1 is an elevation of my improved artificial tree.

Fig. 2 is an enlarged view of my improved tree showing it in the course of construction.

Fig. 3 is a greatly enlarged fragmentary view of a tree limb.

Fig. 4 is a greatly enlarged fragmentary view showing the construction of the limbs and method of binding a plurality of limbs together, and Fig. 5 is a fragmentary view of a modification of my invention.

Referring to the drawing by reference characters I have indicated my improved tree generally at 10. As shown in the accompanying drawing the tree 10 comprises a trunk 12 having limbs 14 extending therefrom, some of which include branches 15.

The preferred form of tree as shown includes a central wire 16 which extend substantially the full length of the tree and is topped by a piece of tinsel wire 17. Other pieces of tinsel wire 18 form the top of the tree. The tinsel which I prefer to use includes a central core or strand of flexible wire to which the tinsel material is secured or interwoven therewith.

The central wire 16 is wrapped with cotton string 19 and the terminal piece of tinsel 17 and the upper limbs formed by lengths of tinsel 18 are secured to the wire 16 by the wrapping 19 which hides the wire.

Each of the lower limbs 14 which may include a number of branches, comprises a wire 20 bound with a wrapping of string 21. This wrapper 21 also serves to secure the branches 15 to the wires 20. The wires 20 of each of the limbs 14 preferably extend downward parallel with the wire 16 to the bottom of the tree, thus each additional limb adds to the diameter of the tree trunk 12 and gives it a tapering effect similar to a real tree.

The lower ends of the limbs 14 are all bound together with a wrapping of cotton string 22 which makes it appear as though the trunk 12 were a single member having the branches 14 springing therefrom in a lifelike manner.

Over the cotton string covering 21 of the limbs I prefer to wrap a tinseled cord 24 and over the cotton string covering 22 of the trunk I prefer to wrap a tinseled cord 25 (see Figs. 3 and 4).

For storage or shipping the limbs 14 may be straightened to lay parallel with the trunk 12 and bent to their natural position again when the tree is set up.

Any suitable form of base may be used to support the tree but I have shown a block of wood 27 having a central aperture 28 therein in which the trunk of the tree is adapted to be positioned.

The wrappings, tinsel, base, etc., will all be white to simulate snow unless other effects are desired.

In constructing a Christmas tree according to my invention, I first take a piece of wire and holding the end of the tinsel 17 in overlapped relation with respect to the end of the wire I wrap the cotton covering 19 about the overlapped portions to secure the tinsel 17 to the end of the wire. This done I continue the wrapping down the wire 16 inserting the branches 18 under the wrapping at proper spaced intervals.

When the desired number of single branches 18 have been secured to the wire 16 I take one of the limbs 14 and continue the wrapping along the wire 16 and bind the end of the limb beneath this wrapping to secure it in position. This operation is continued until the branches have been distributed along the wire 16 in the desired fashion.

After the branches are in place I may then wrap the tinsel cord 25 about the wrapping.

If desired, instead of employing the tinsel cords 24 and 25 I may space the wrapping as indicated in Fig. 5.

In Fig. 5 it will be noted that the wire is indicated at 30 and the tinsel strip is indicated at 31. The wrapping, which is preferably a plain cotton cord is shown at 32.

Parts of tinsel 33 project through the loops of the winding which are spaced apart for that purpose. The tinsel length in this case furnishes the necessary trim along the stem and I sometimes prefer to make the tree in this fashion. I may, if desired, use this last described means on the limbs of the tree and on the trunk of the tree I may employ the tinseled cord.

From the foregoing description it will be apparent that I have provided a novel artificial tree which greatly simulates a real tree, which is simple in construction and which is economical to manufacture.

Having thus described my invention, I claim:

1. In an artificial tree, a plurality of limbs, each of said limbs comprising a relatively flexible wire wound with cord and having a tinseled cord wound over said cord, a length of tinsel secured adjacent the end of said wire by said cord and other lengths of tinsel secured to said wire by said cord intermediate the length of said wire.

2. In an artificial tree, a trunk comprising a plurality of wires, a cord bound about said wires and covering the same, one of said wires of said trunk extending the full length of the tree, the other wires branching from said trunk to form limbs, said wires forming limbs being covered with cord, said limbs having tinsel bound thereby by said cord to form branches, said full length of wire being wound with cord and lengths of tinsel secured to the upper end of said trunk to form short branches.

3. In an artificial tree, a trunk comprising a plurality of wires bound together with cord and having a tinseled cord wound over said cord, one of said wires of said trunk extending the full length of the tree and the other of said wires extending from said trunk to form limbs, said wires forming the limbs being wound with cord and having a tinseled cord wound over said cord, said limbs having lengths of tinsel bound thereto by said cord to form branches.

4. In an artificial tree, a base, a trunk supported by said base, said trunk comprising a plurality of wires bound together with cord and having a tinseled cord wound over said cord, one of said wires of said trunk extending the full length of the tree and the other of said wires extending from said trunk at spaced points therealong to form limbs, all of said wires forming the limbs being wound with cord, said limbs having lengths of tinsel bound thereto by said cord to form branches, one end of said full length wire being wound with cord and having a tinseled cord wound over said cord, and lengths of tinsel secured to said full length wire to form short limbs.

5. In an artificial tree, a limb comprising a wire having a covering thereon, said covering including tinsel, and a plurality of branches on said limb, said branches including tinseled members, said members being secured to said wire by tinseled wrappings.

6. For use in an artificial tree, a wire having a cover wrapped thereon and having a tinseled cord wound over said cover and a strip of tinsel bound to said wire by said cover.

7. For use in an artificial tree, a wire, a plurality of lengths of tinsel spaced along said wire to form branches, the exposed portion of said wire being covered by a winding, said winding securing said length of tinsel to said wire, the loops of said winding being spaced where it engages the tinsel length to allow the tinsel to be visible between the loops.

In testimony whereof, I hereunto affix my signature.

BERT A. LANDERS.